(12) United States Patent
Cheng et al.

(10) Patent No.: US 11,856,971 B2
(45) Date of Patent: Jan. 2, 2024

(54) METHOD FOR IMPROVING IMMUNITY IN SHRIMPS

(71) Applicant: NATIONAL PINGTUNG UNIVERSITY OF SCIENCE & TECHNOLOGY, Pingtung County (TW)

(72) Inventors: Wen-Teng Cheng, Pingtung County (TW); Wan-Lin Tsai, Pingtung County (TW); Hsin-Wei Kuo, Pingtung County (TW); Yu-Fen Liu, Pingtung County (TW); Chin-Chyuan Chang, Pingtung County (TW); Yu-Hung Lin, Pingtung County (TW)

(73) Assignee: NATIONAL PINGTUNG UNIVERSITY OF SCIENCE & TECHNOLOGY, Pingtung County (TW)

( * ) Notice: Subject to any disclaimer, the term of this patent is extended or adjusted under 35 U.S.C. 154(b) by 1208 days.

(21) Appl. No.: 16/507,722

(22) Filed: Jul. 10, 2019

(65) Prior Publication Data
US 2020/0305467 A1 Oct. 1, 2020

(30) Foreign Application Priority Data
Mar. 29, 2019 (TW) .................. 108111292

(51) Int. Cl.
*A23K 50/80* (2016.01)
*A23K 10/30* (2016.01)
*A61D 7/00* (2006.01)

(52) U.S. Cl.
CPC .............. *A23K 50/80* (2016.05); *A23K 10/30* (2016.05); *A61D 7/00* (2013.01); *A01K 2207/20* (2013.01); *A01K 2207/25* (2013.01); *A01K 2227/70* (2013.01)

(58) Field of Classification Search
CPC ................................. A23K 50/80; A23K 10/30
USPC ............................................................ 800/8
See application file for complete search history.

(56) References Cited

PUBLICATIONS

Kuo, 2023, Fish and Shellish Immunology, 132:1108504, pp. 1-13.*
Lee, 2020, Fish and Shellish Immunology, 104:357-366.*
Lee, 2020, Fish and Shellish Immunology, 104:545-556.*

* cited by examiner

*Primary Examiner* — Valarie E Bertoglio
(74) *Attorney, Agent, or Firm* — WPAT, P.C.

(57) ABSTRACT

The invention discloses a method for improving immunity in shrimps, by administering an extract of cocoa rind to a shrimp body to improve immunity of the shrimp body. The extract of cocoa rind is obtained by extracting a dried sample of cocoa rind by an aqueous ethanol solution with a concentration of ethanol being 90-98%. The dried sample of cocoa rind has a water content of 2-5%.

4 Claims, 6 Drawing Sheets

METHOD FOR IMPROVING IMMUNITY IN SHRIMPS

CROSS REFERENCE TO RELATED APPLICATIONS

The application claims the benefit of Taiwan application serial No.108111292, filed Mar. 29, 2019, the entire contents of which are incorporated herein by reference.

BACKGROUND OF THE INVENTION

1. Field of the Invention

The present invention generally relates to a method for improving immunity in shrimps, and more particularly, to a method for improving immunity in shrimps using an extract of cocoa rind.

2. Description of the Related Art

Nowadays, shrimp farming is explosion in Taiwan. The farmed shrimps can not only be served as sources of food, but also be exported to foreign countries for economic benefits. In order to reduce the cost, farmed shrimps are usually grown at high densities.

Farming at high densities may result in deterioration of the farming environment; and therefore, the farmed shrimps have a higher mortality due to cross infection. Although addition of antibiotics can reduce the mortality, the abusiveness of antibiotics is the reason that sparks allergic reaction, as well as the cause of drug resistance.

In light of this, it is necessary to provide a method for improving immunity in shrimps.

SUMMARY OF THE INVENTION

It is therefore the objective of this invention to provide a method for improving immunity in shrimps.

One embodiment of the invention discloses a method for improving immunity in shrimps, by administering an extract of cocoa rind to a shrimp body to improve immunity of the shrimp body. The extract of cocoa rind is obtained by extracting a dried sample of cocoa rind by an aqueous ethanol solution with a concentration of ethanol being 90-98%. The dried sample of cocoa rind has a water content of 2-5%. Accordingly, by administering the extract of cocoa rind to the shrimp body, phagocytic activity and clearance efficiency are increased, and mortality caused by pathogens is decreased. With such performance, farmers can decrease the usage of antibiotics.

In a preferred form shown, the extract of cocoa rind is administered to the shrimp body by injection, preferably by injection into the ventral sinus of the cephalothorax. As such, the extract of cocoa rind can flow towards tissues along haemolymph; and therefore, the extract of cocoa rind shows a preferable effect on improving immunity in shrimps.

In a preferred form shown, the extract of cocoa rind is administered to the shrimp body in a dosage of 0.6 µg/g of the shrimp body. As such, by the specialized dosage, the extract of cocoa rind shows a preferable effect on improving immunity in shrimps.

In a preferred form shown, the extract of cocoa rind is orally administered to the shrimp body. Preferably, the extract of cocoa rind and a feed can be co-administered to the shrimp body. As such, the extract of cocoa rind can be added in the water, and the shrimp can freely take the extract of cocoa rind, thereby increasing convenience for administering the extract of cocoa rind.

In a preferred form shown, the extract of cocoa rind is administered to the shrimp body in a dosage of 120 µg/g of the shrimp body for 7-28 days. As such, by the specialized dosage, the extract of cocoa rind shows a preferable effect on improving immunity in shrimps.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1A:
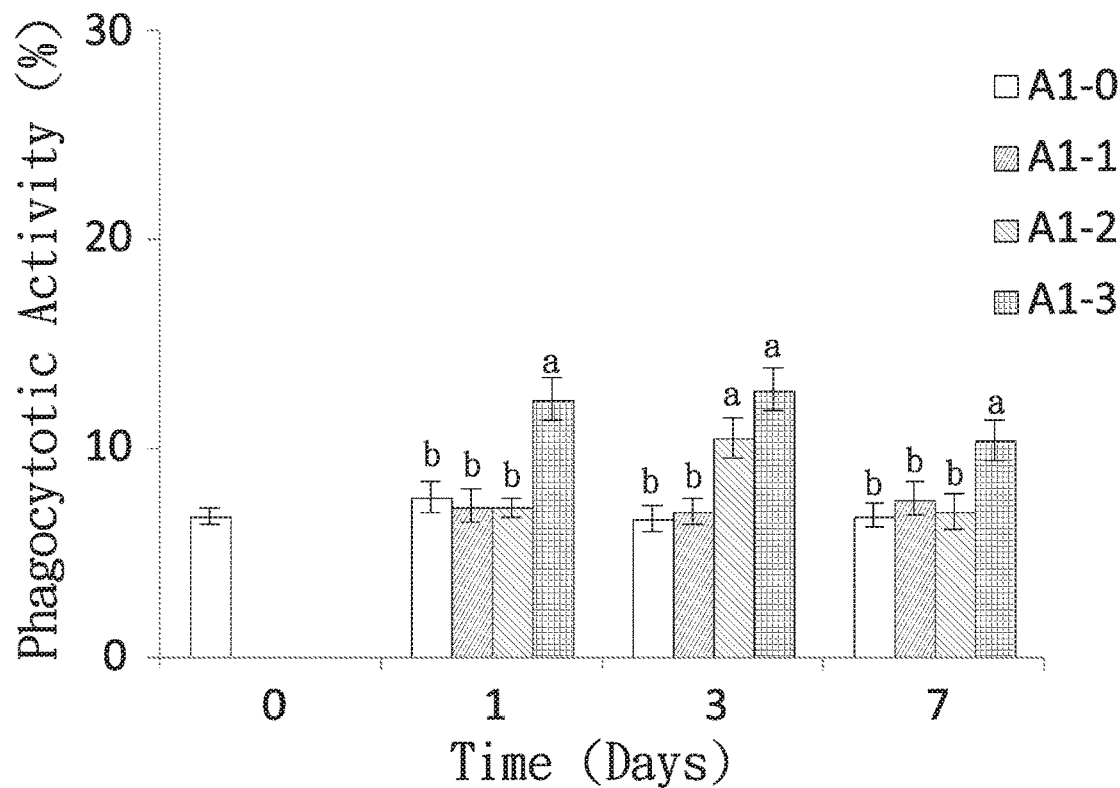
FIG. 1a depicts phagocytic activities of hemocytes in the white shrimps of groups A1-0, A1-1, A1-2 and A1-3 in trial (A).

The term "cocoa rind" refers to a shell left after cocoa beans are drawn out from a cocoa pod. Specifically, the cocoa beans drawing out from the cocoa pod can be applied to manufacture chocolate after fermentation, solarization and roasting; and therefore, the cocoa rind is usually thought as a waste of manufacturing chocolate.

The shrimp according to the present invention indicates farmed shrimp, including, but not limited to Pacific white shrimp (*Litopenaeus vannamei*), giant tiger prawn (*Penaeus monodon*), Kuruma shrimp (*Marsupenaeus japonicus*), Chinese white shrimp (*Fenneropenaeu schinensis*), Indian prawn (*Fenneropenaeus indicus*), greasyback shrimp (*Metapenaeus ensis barbata*), redtail shrimp (*Penaeus penicillatus*) and giant river prawn (*Macrobrachium rosenbergii*).

An extract of cocoa rind according to an embodiment of the present invention can refer to a product obtained by extracting a sample of cocoa rind by an aqueous ethanol solution used as an extractant. As an example, a worker can mix the aqueous ethanol solution (2,000-3,000 mL, with the concentration of ethanol being 90-98%) with the sample of cocoa rind (100 grams). After extracting by the extractant at 4° C. for 16-24 hours, a floc is obtained. The floc is then washed and dried to obtain the extract of cocoa rind.

Specifically, before the extraction process, the worker can first dried the sample of cocoa rind to obtain a dried sample of cocoa rind with a water content of 2-5%. (Before drying, the water content of the sample of cocoa rind, that is, a fresh sample of cocoa, is about 80-90%). Thus, active gradients in the fresh sample of cocoa rind can polymerize to form the active gradients with a better effect on improving immunity. In this embodiment, the fresh sample of cocoa rind is oven-dried at 50° C. for 7 days to obtain the dried sample of cocoa rind with the water content of about 2.4%. Besides, the sample of cocoa rind can also be milled to particles with particle size ranging from 0.17 to 0.25 mm in advance as well. With such performance, the contacting surface area of the sample of cocoa rind with water is increased, and therefore, the efficiency of the extraction is also increased.

Moreover, before the extraction process, the worker can mix the dried sample of cocoa rind and water, followed by heating at 90-100° C. for 10-20 minutes to release the active ingredients from the dried sample of cocoa rind. A supernatant can be obtained by centrifugation, and the extraction process is carried out to obtain the extract of cocoa rind. In this embodiment, 30 grams of the dried sample of cocoa rind is mixed with 400 mL of water, followed by heating at 95° C. for 15 minutes. After centrifugation, 300 mL of the supernatant is obtained, and 900 mL of the aqueous ethanol solution with the concentration of ethanol being 95% is used to carry out the extraction process. Finally, about 3.2 grams of the extract of cocoa rind is obtained.

The extract of cocoa rind can increase the phagocytic activity of hemocytes, and can help to clear the pathogens from the haemolymph. The extract of cocoa rind can also moderate pathogen-induced mortality as well as cold mortality. Therefore, the extract of cocoa rind can be administered to the shrimp body in an effective dosage for improving immunity in shrimps.

As an example, the extract of cocoa rind can be administered to the shrimp body by injection, preferably by injection into the ventral sinus of the cephalothorax. The ventral sinus near the heart is the centrostigma of haemolymph in shrimps, such that the extract of cocoa rind can flow towards tissues along haemolymph. In the first embodiment, the shrimp body with weight of 8-12 grams is used, and the effective dosage is 0.6 µg/g.

Also, the extract of cocoa rind can be orally administered to the shrimp body. For example, a mixture formed by mixing the extract of cocoa rind and a feed can be added in the water. Thus, the shrimp can freely take the extract of cocoa rind. In the second embodiment, the shrimp body with weight of 8-12 grams is also used. 1 kilogram of feed is mixed with 1-6 grams of the extract of cocoa rind to form the mixture. The mixture is added in the water for 7-28 days, and the effective dosage is 120 µg/g daily.

As an example, the formula of the feed can be shown in TABLE 1. The fermented soybean meal can be the fermented soybean meal (DaBomb-P) purchased from DaBomb Protein Corp., Taiwan. The pre-mix includes vitamins and minerals.

TABLE 1

| Formula | grams |
| --- | --- |
| Fish Meal | 470 |
| α-Starch | 130 |
| Squid Cream | 50 |
| Shrimp Meal | 50 |
| Gluten | 30 |
| Fermented Soybean Meal | 140 |
| Flour | 100 |
| Pre-mix | 30 |

To evaluate the extract of cocoa rind shows effect on improving immunity in shrimps, the dried sample of cocoa rind (water content: 4.2%) obtained by drying 100 grams of the fresh sample of cocoa rind is mixed with 400 mL of water, followed by heating at 95° C. for 15 minutes. The supernatant (300 mL) obtained by centrifugation is mixed with 3-fold volume of the 95% aqueous ethanol solution. After the extraction process at 4° C. overnight, the floc is obtained by centrifugation. The floc is then washed and dried to form the extract of cocoa rind according to the present invention (about 3.2 grams).

In addition, 100 grams of the fresh sample of cocoa rind (water content: 85%) is mixed with 333.3 mL of water, followed by heating at 95° C. for 15 minutes. The supernatant (250 mL) obtained by centrifugation is mixed with 3-fold volume of the 95% aqueous ethanol solution. After the extraction process at 4° C. overnight, the floc is obtained by centrifugation. The floc is then washed and dried to form the control extract of cocoa rind (about 1.6 grams).

White shrimps, *Litopenaeus vannamei*, are obtained from a commercial farm in Pingtung, Taiwan. The white shrimps are acclimated in the laboratory (freshwater; salinity 20 ppt; temperature 27±1° C.; pH value 8.2-8.7) for 2 weeks before experimentation.

Trial (A).

With reference to TABLE 2, the extract of cocoa rind according to the present invention, or the control extract of cocoa rind is administered to the white shrimp by injection. After 1 day, the white shrimp is challenged by *Vibro algonilyticus* (2×10⁷ CFU/shrimp) by injection. 1.5-hours later, hymolymph is withdrawn from the ventral sinus of each white shrimp. The phagocytic activity and the clearance efficiency of the white shrimp of groups A1-0, A1-1, A1-2, A1-3, A2-0, A2-1, A2-2 or A2-3 are measured.

TABLE 2

| Group | Dosage of the extract of cocoa rind according to the present invention (µg/µL) | Group | Dosage of control extract of cocoa rind (µg/µL) |
| --- | --- | --- | --- |
| A1-0 | 0 | A2-0 | 0 |
| A1-1 | 0.075 | A2-1 | 0.15 |
| A1-2 | 0.15 | A2-2 | 0.3 |
| A1-3 | 0.3 | A2-3 | 0.6 |

Figure 1B:
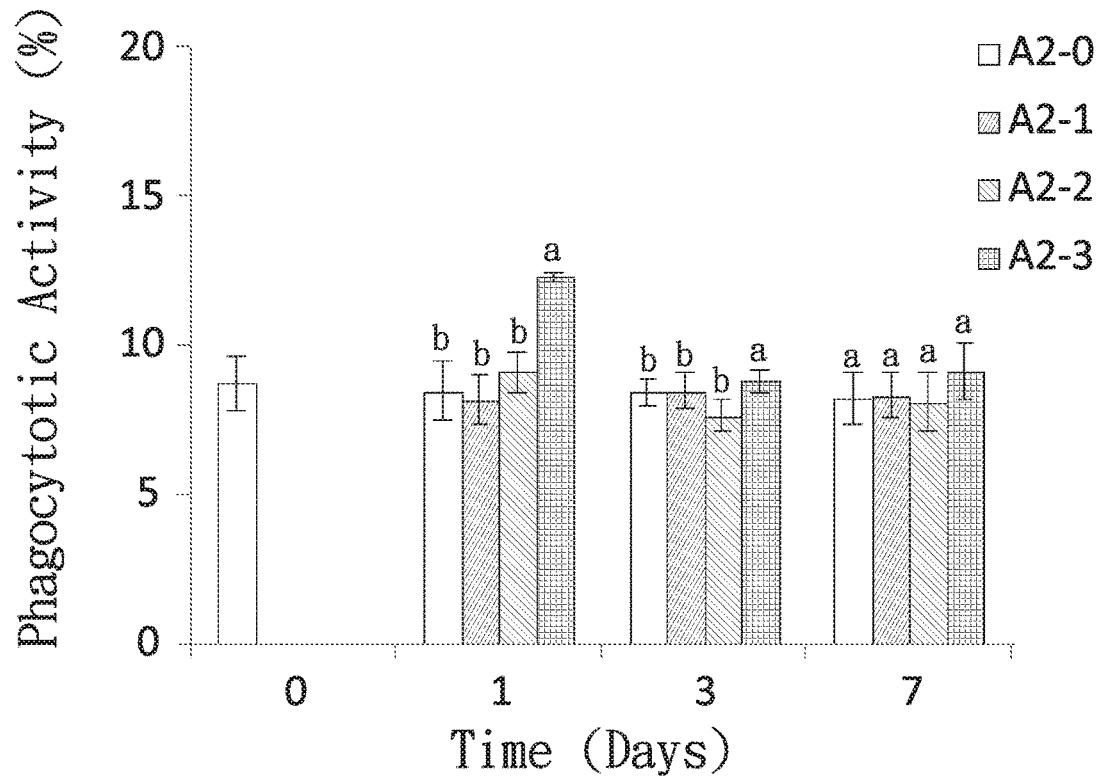
FIG. 1b depicts phagocytic activities of hemocytes in the white shrimps of groups A2-0, A2-1, A2-2 and A2-3 in trial (A).

Referring to FIGS. 1*a* & 1*b*, the white shrimp of group A1-3 which is administered by the extract of cocoa rind according to the present invention has an improved phagocytic activity, and the improved phagocytic activity lasts up to 7 days. Although the white shrimp of group A2-3 which is administered by the control extract of cocoa rind has a slightly improved phagocytic activity, the improved phagocytic activity merely lasts 3 days. That is, the extract of cocoa rind according to the present invention has a preferable effect on improving the phagocytic activity.

Figure 2A:
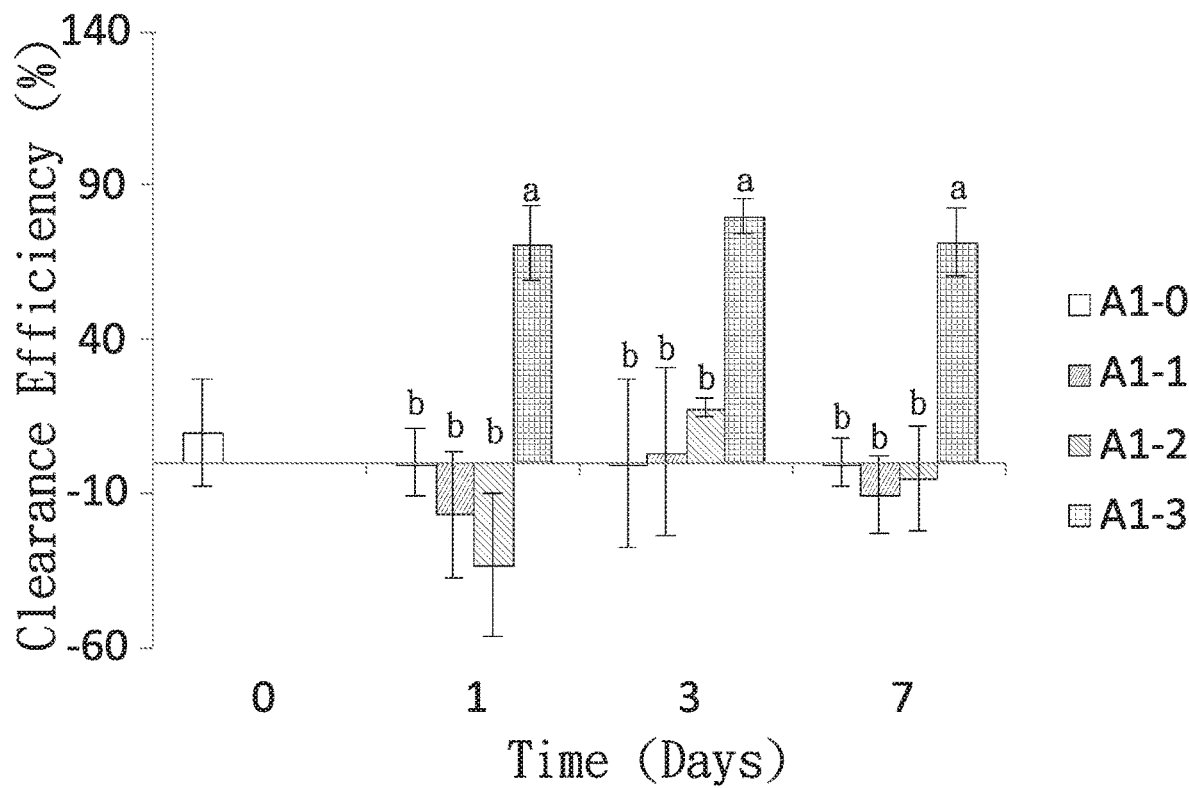
FIG. 2a depicts clearance efficiencies of white shrimps of groups A1-0, A1-1, A1-2 and A1-3 in trial (A).
Figure 2B:
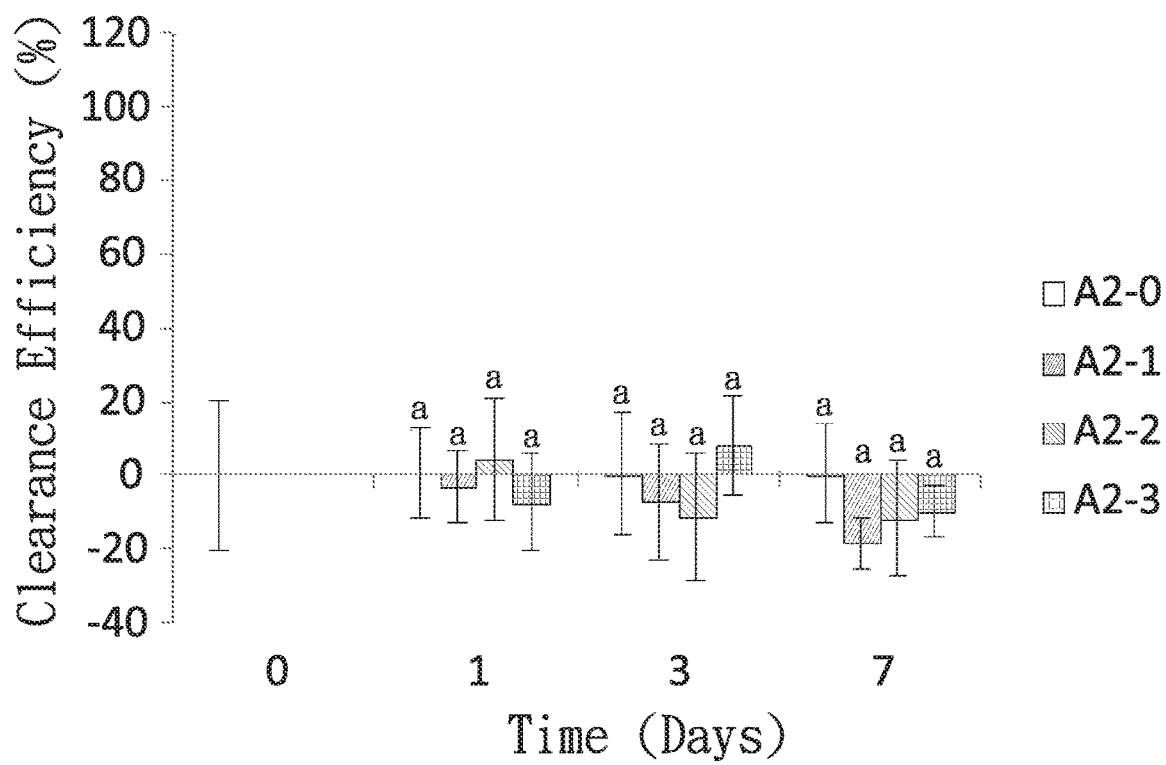
FIG. 2b depicts clearance efficiencies of white shrimps of groups A2-0, A2-1, A2-2 and A2-3 in trial (A).

Referring to FIGS. 2a & 2b, the white shrimp of group A1-3 which is administered by the extract of cocoa rind according to the present invention has an improved clearance efficiency, and the improved clearance efficiency also lasts up to 7 days. Moreover, the improved clearance efficiency cannot be seen in the white shrimp which is administered by the control extract of cocoa rind (groups A2-1, A2-2 and A3-3), suggesting the extract of cocoa rind according to the present invention has a preferable effect on improving the clearance efficiency.

Accordingly, compared to the administration of the control extract of cocoa rind, the administration of the extract of cocoa rind according to the present invention can help the clearance of V. algonilyticus from hymolymph.

Trial (B).

With reference to TABLE 3, the extract of cocoa rind according to the present invention, or the control extract of cocoa rind is administered to the white shrimp. After 1 day, the white shrimp is challenged by V. algonilyticus (dosage: $2 \times 10^5$ CFU/shrimp) by injection. The cumulative mortality of the white shrimp within 144 hours post challenge is recorded.

TABLE 3

| Group | V. algonilyticus | The extract of cocoa rind |
|---|---|---|
| B1-0 | X | X |
| B1-1 | O | X |
| B1-2 | O | The extract of cocoa rind according to the present invention (0.3 µg/µL) |
| B2-0 | X | X |
| B2-1 | O | X |
| B2-2 | O | The control extract of cocoa rind (0.6 µg/µL) |

Figure 3A:
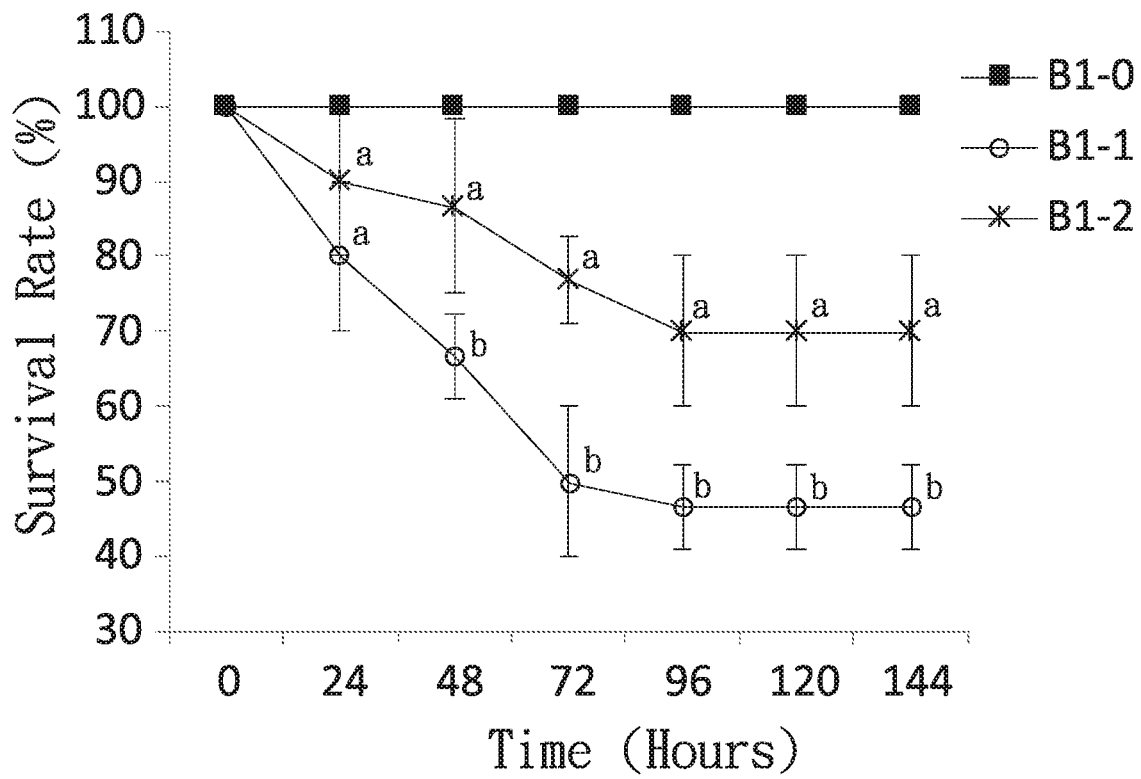
FIG. 3a depicts survival rates of white shrimps of groups B1-0, B1-1 and B1-2 within 144 hours post challenge in trial (B).
Figure 3B:
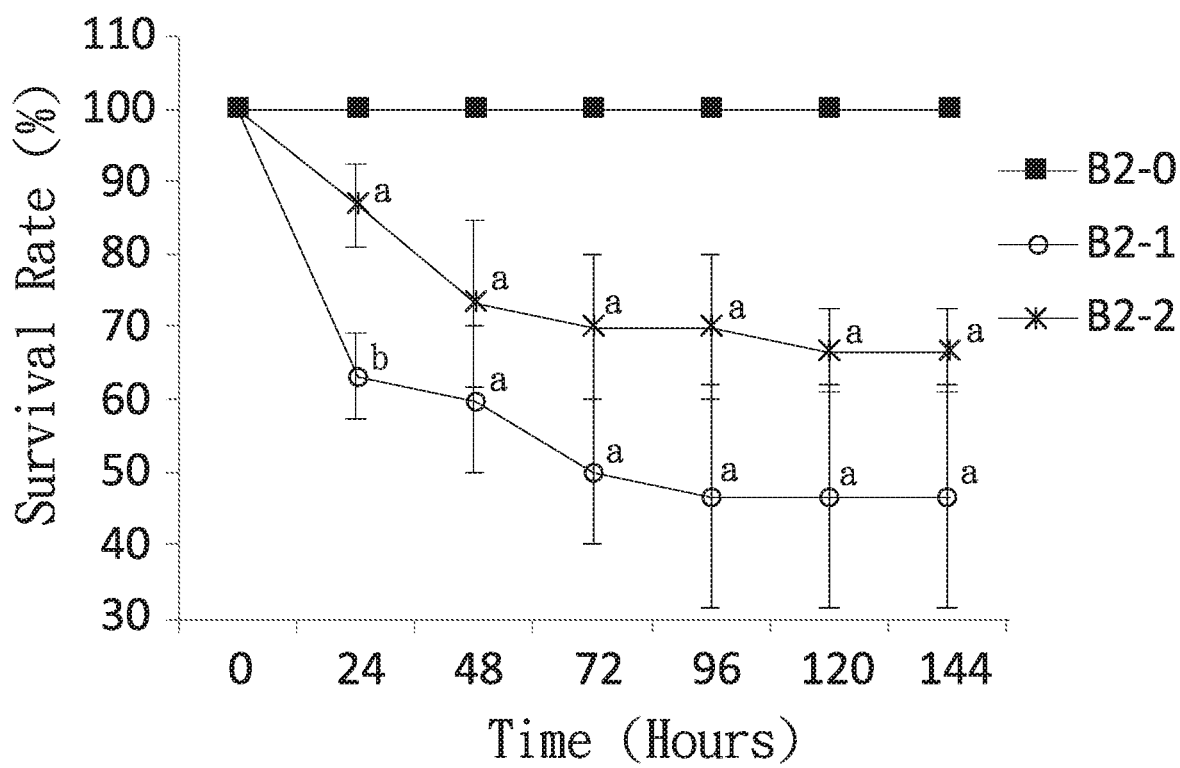
FIG. 3b depicts survival rates of white shrimps of groups B2-0, B2-1 and B2-2 within 144 hours post challenge in trial (B).

Referring to FIGS. 3a & 3b, compared to the white shrimp of group B1-1 which is administered by neither the extract of cocoa rind according to the present invention nor the control extract of cocoa rind, the white shrimp of group B1-2 which is administered by the extract of cocoa rind according to the present invention has a lower cumulative mortality at 48-144 hours post challenge. The cumulative mortality at 144 hours post challenge decreases by about 23.3%. The cumulative mortality of the white shrimp of group B2-2 which is administered by the control extract of cocoa rind decreases at the time point of 24 hours post challenge, suggesting the extract of cocoa rind according to the present invention can be used to effectively prevent from the infection of V. algonilyticus, and to effectively decrease the mortality of the white shrimp due to the infection of V. algonilyticus.

Trial (C).

With reference to TABLE 4, different dosage of the extract of cocoa rind according to the present invention, and different dosage of the control extract of cocoa rind is administered to the white shrimp, respectively. After 1 day, the white shrimp is transferred to water at 14° C. The cumulative mortality of the white shrimp within 96 hours post shock is recorded.

TABLE 4

| Group | Water temperature (° C.) | The extract of cocoa rind |
|---|---|---|
| C1-0 | 28 | X |
| C1-1 | 14 | X |
| C1-2 | 14 | The extract of cocoa rind according to the present invention (0.3 µg/µL) |
| C2-0 | 28 | X |
| C2-1 | 14 | X |
| C2-2 | 14 | The control extract of cocoa rind (0.6 µg/µL) |

Figure 4A:
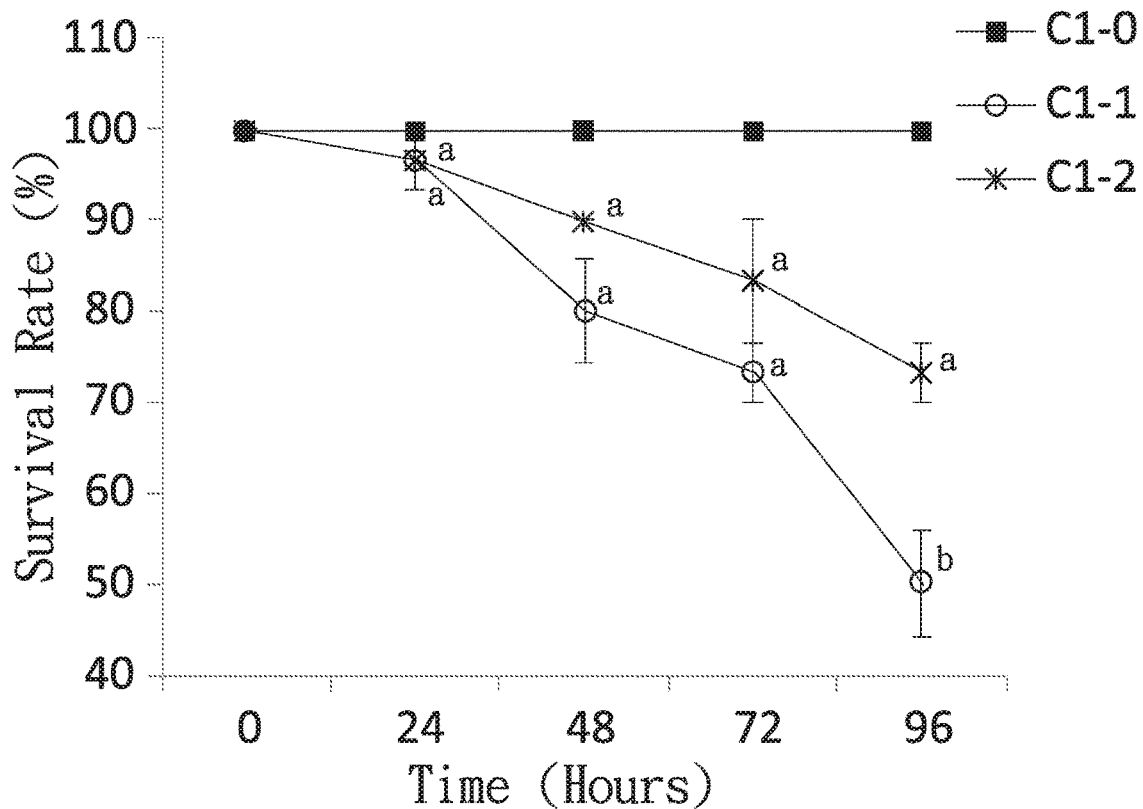
FIG. 4a depicts survival rates of white shrimps of groups C1-0, C1-1 and C1-2 within 96 hours post shock in trial (C).
Figure 4B:
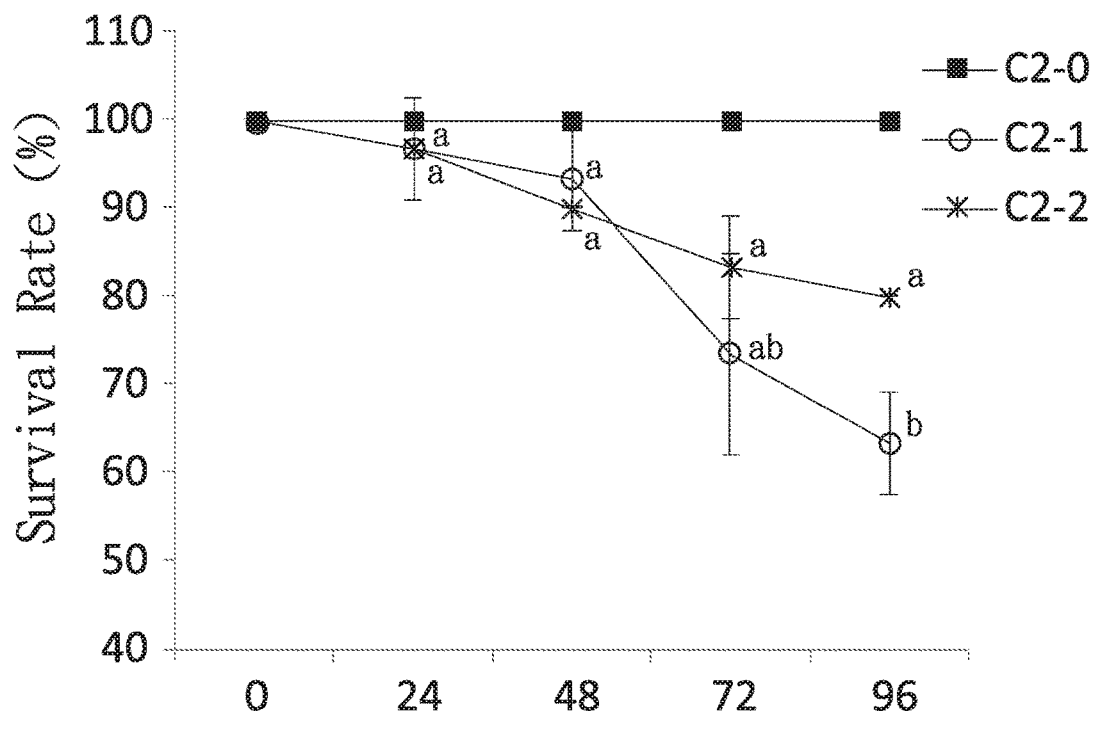
FIG. 4b depicts survival rates of white shrimps of groups C2-0, C2-1 and C2-2 within 96 hours post shock in trial (C).

Referring to FIGS. 4a & 4b, compared to the white shrimp of group C1-1 which is administered by neither the extract of cocoa rind according to the present invention nor the control extract of cocoa rind, the white shrimp of group C1-2 which is administered by the extract of cocoa rind according to the present invention has a significantly lower cumulative mortality at 48-96 hours post shock. The cumulative mortality at 96 hours post shock decreases by about 23.3%. The cumulative mortality of the white shrimp of group C2-2 which is administered by the control extract of cocoa rind at 96 hours post shock merely decreases by about 16.7%, suggesting the extract of cocoa rind according to the present invention can be used to effectively prevent the white shrimp from decreasing of the health status and from the risk of mortality due to low temperature.

Trial (D).

With reference to TABLE 5, the feed with different dosage of the extract of cocoa rind according to the present invention is added in the water for freely taking by the white shrimp. After freely taking for 7 days, 15 days or 28 days, the white shrimp is challenged by V. algonilyticus. 1.5-hours later, hymolymph is withdrawn from the ventral sinus of each shrimp. The phagocytic activity and the clearance efficiency of the white shrimp are measured.

TABLE 5

| Group | The extract of cocoa rind (µg/g) |
|---|---|
| D1-0 | 0 |
| D1-1 | 20 |
| D1-2 | 60 |
| D1-3 | 120 |

Figure 5A:
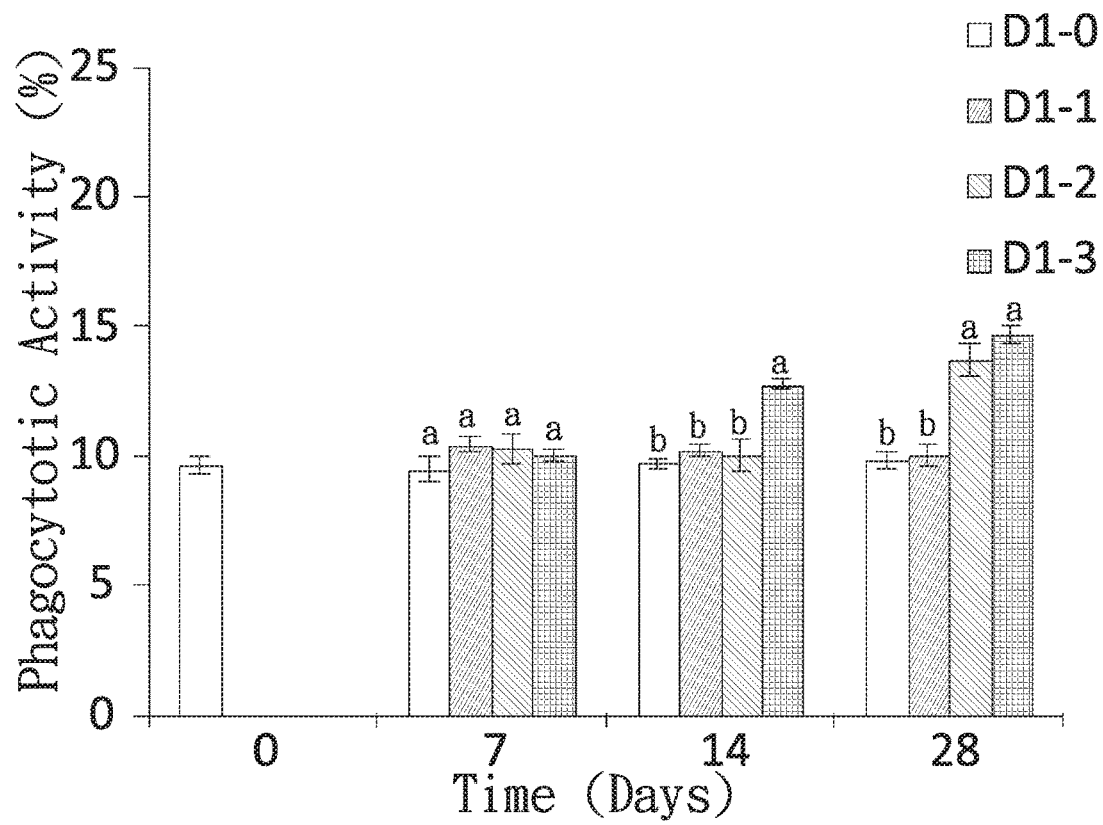
FIG. 5a depicts phagocytic activities of hemocytes in the white shrimps of groups D1-0, D1-1, D1-2 and D1-3 in trial (D).

Referring to FIG. 5a, after freely taking the feed including the extract of cocoa rind according to the present invention for 14 days, the white shrimp of group D1-3 has an improved phagocytic activity, and the improved phagocytic activity lasts up to 28 days. The white shrimp of group D1-2 which freely takes the feed including the extract of cocoa rind according to the present invention merely has an improved phagocytic on 28 days post challenge.

Figure 5B:
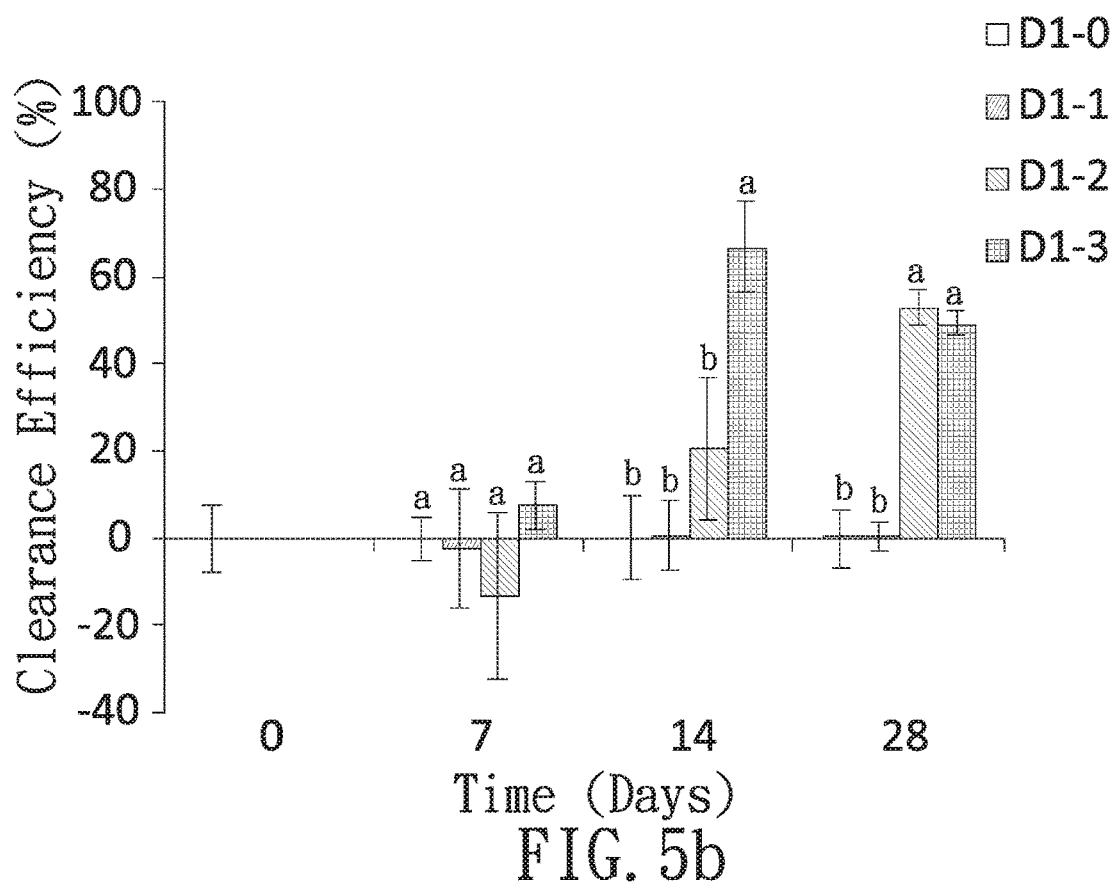
FIG. 5b depicts clearance efficiencies of white shrimps of groups D1-0, D1-1, D1-2 and D1-3 in trial (D).

Referring to FIG. 5b, after freely taking the feed including the extract of cocoa rind according to the present invention for 14 days, the white shrimp of group D1-3 has an improved clearance efficiency, and the improved clearance efficiency lasts up to 28 days. The white shrimp of group D1-2 which freely takes the feed including the extract of cocoa rind according to the present invention merely has an improved clearance efficiency on 28 days post challenge.

With reference to TABLE 6, the feed with different dosage of the extract of cocoa rind according to the present invention is added in the water for freely taking by the white shrimp. After freely taking for 7 days, 14 days or 28 days, the white shrimp is challenged by V algonilyticus. The cumulative mortality of the white shrimp within 144 hours post challenge is recorded.

TABLE 6

| Group | V. algonilyticus | The extract of cocoa rind |
|---|---|---|
| D2-0 | X | X |
| D2-1 | ○ | X |
| D2-2 | ○ | The extract of cocoa rind according to the present invention (120 μg/g) |

Figure 5C:
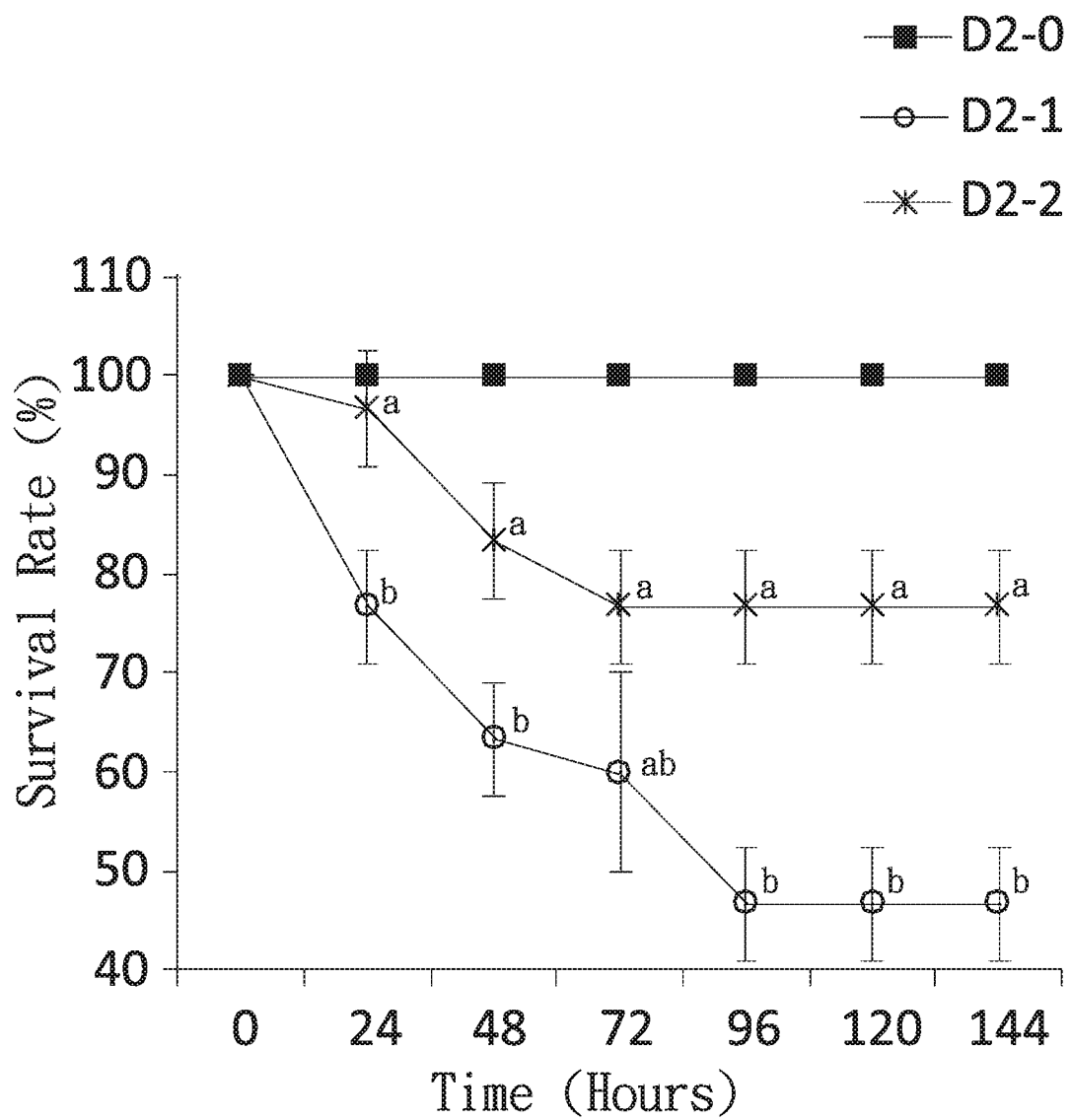
FIG. 5c depicts survival rates of white shrimps of groups D1-0, D1-1, D1-2 and D1-3 within 144 hours post challenge in trial (D).

Referring to FIG. 5c, compared to the white shrimp of group D2-1 which is administered by neither the extract of cocoa rind according to the present invention nor the control extract of cocoa rind, the white shrimp of group D2-2 which is administered by the extract of cocoa rind according to the present invention has a lower cumulative mortality at 24-144 hours post challenge. The cumulative mortality at 144 hours post challenge decrease by about 30%. That is, the extract of cocoa rind according to the present invention can be used to effectively prevent from the infection of V. algonilyticus, and to effectively decrease the mortality of the white shrimp due to the infection of V. algonilyticus.

Accordingly, by administering the extract of cocoa rind to the shrimp body, phagocytic activity and clearance efficiency are increased, and mortality caused by attack of pathogens is decreased. With such performance, farmers can decrease the usage of antibiotics.

Moreover, the extract of cocoa rind can be used to applied for improving immunity in shrimps. As such, the cocoa rind, which is usually thought as the waste of manufacturing chocolate, has a new economic output.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A method for improving immunity in shrimps, by administering an extract of cocoa rind to a shrimp body to improve immunity of the shrimp body, wherein the extract of cocoa rind is obtained by extracting a dried sample of cocoa rind by an aqueous ethanol solution with a concentration of ethanol being 90-98%, wherein the dried sample of cocoa rind has a water content of 2-5%;

wherein the extract of cocoa rind is administered to the shrimp body by injection at a dosage of 0.6 μg/g of the shrimp body, or the extract of cocoa rind is orally administered to the shrimp body at a dosage of 120 μg/g of the shrimp body per day.

2. The method for improving immunity in shrimps as claimed in claim 1, wherein when the extract of cocoa rind is administered to the shrimp body by injection, the extract of cocoa rind is injected into the ventral sinus of the cephalothorax of the shrimp.

3. The method for improving immunity in shrimps as claimed in claim 1, wherein when the extract of cocoa rind is orally administered to the shrimp body, the extract of cocoa rind and a feed are co-administered to the shrimp body.

4. The method for improving immunity in shrimps as claimed in claim 1, wherein when the extract of cocoa rind is orally administered to the shrimp body, the extract of cocoa rind is administered to the shrimp body for 7-28 days.

* * * * *